UNITED STATES PATENT OFFICE.

PETER DOYLE AND FREDERICK P. COLTON, OF HARTFORD, CONNECTICUT.

IMPROVED COMPOUND FOR POLISHING AND CLEANING MARBLE.

Specification forming part of Letters Patent No. 104,285, dated June 14, 1870.

We, PETER DOYLE and FREDERICK P. COLTON, both of Hartford, county of Hartford, and State of Connecticut, have invented a certain Compound for Cleansing the Surface of Marble, Granite, Metals, and the like.

This compound consists of three ingredients—namely, alcohol, vinegar, and finely-sifted coal-ash. These ingredients, when mixed in any proportions, are possessed of most wonderful cleansing properties; but we have found the best proportion to be one gallon of vinegar, two quarts of alcohol, and one quart of finely-sifted hard-coal ash. By "hard-coal ash" is meant the ashes of anthracite coal.

It has been well known heretofore that alcohol is possessed of strong powers as a solvent; also, that vinegar is possessed of peculiar solvent powers. It has not been known that these liquids, when mixed, not only do not interfere one with the other, but actually assist each the other.

Coal-ash not only cleanses by its power of attrition, but its peculiar alkaline property does not appear to be neutralized by the acetic acid contained in the vinegar.

Taken all together, these ingredients attack and dissolve all matters likely to gather upon the surface of stone or metals.

Claim.

We claim as our invention—

A cleansing-mixture made of the ingredients named, in about the proportions specified.

PETER DOYLE.
FREDERICK P. COLTON.

Witnesses:
M. C. AMES,
JNO. D. PATTEN.